United States Patent [19]
Berliner et al.

[11] 3,914,002
[45] Oct. 21, 1975

[54] CONDUCTIVE TUBING AND METHOD OF MAKING SAME

[75] Inventors: Mayer Berliner, Lake Luzerne; James G. Stewart, Amsterdam, both of N.Y.

[73] Assignee: Sherwood Medical Industries Inc., St. Louis, Mo.

[22] Filed: Apr. 17, 1974

[21] Appl. No.: 461,563

[52] U.S. Cl. ................ 339/16 R; 128/348; 174/47; 174/74 R; 264/105; 264/131; 317/2 J; 425/326 R
[51] Int. Cl.² .................. F16L 11/12; H05F 3/02; A61M 25/00; B29D 23/04
[58] Field of Search ............ 174/47, 74 R, 78, 84 S; 128/2.05 R, 2.05 D, 348, 349 R, 350 R; 138/103, 109, 118, 120; 264/95, 104, 105, 131, 150, 173; 317/2 R, 2 J; 339/15, 16 R; 425/326 R

[56] References Cited
UNITED STATES PATENTS

| | | | |
|---|---|---|---|
| 2,153,199 | 4/1939 | Miller .................................. | 317/2 J |
| 3,070,132 | 12/1962 | Sheridan ........................... | 174/47 X |
| 3,580,983 | 5/1971 | Jackson .............................. | 174/47 |
| 3,626,085 | 12/1971 | Arndt et al......................... | 174/73 R |
| 3,674,404 | 7/1972 | Burlis et al...................... | 425/326 R |

FOREIGN PATENTS OR APPLICATIONS
| | | | |
|---|---|---|---|
| 1,140,034 | 11/1962 | Germany ............................ | 174/47 |

OTHER PUBLICATIONS
Pamphlet entitled "Argyle–The Standard of Excellence in Medical, Surgical Tubes and Catheters," published by Aloe Medical (Division of Brunswick), 16 pages.

*Primary Examiner*—Laramie E. Askin
*Attorney, Agent, or Firm*—Stanley N. Garber; William R. O'Meara

[57] ABSTRACT

A conductive plastic tube for preventing the accumulation of electrostatic charges having a conductive plastic stripe to be grounded and an integral tube connector provided with a conductive plastic coating covering the open end including external and internal walls of the connector and a portion of the stripe. The connector is adapted to connect the tube to another member in fluid tight relation and to electrically connect the conductive stripe to a conductive element of the other member. The tubing is extruded with a conductive stripe and spaced integral conical portions serving as end connectors when severed. The connector is dipped in a solvent dispersion of conductive plastic and thereafter removed and allowed to dry to produce a conductive plastic coating on the connector end.

13 Claims, 7 Drawing Figures

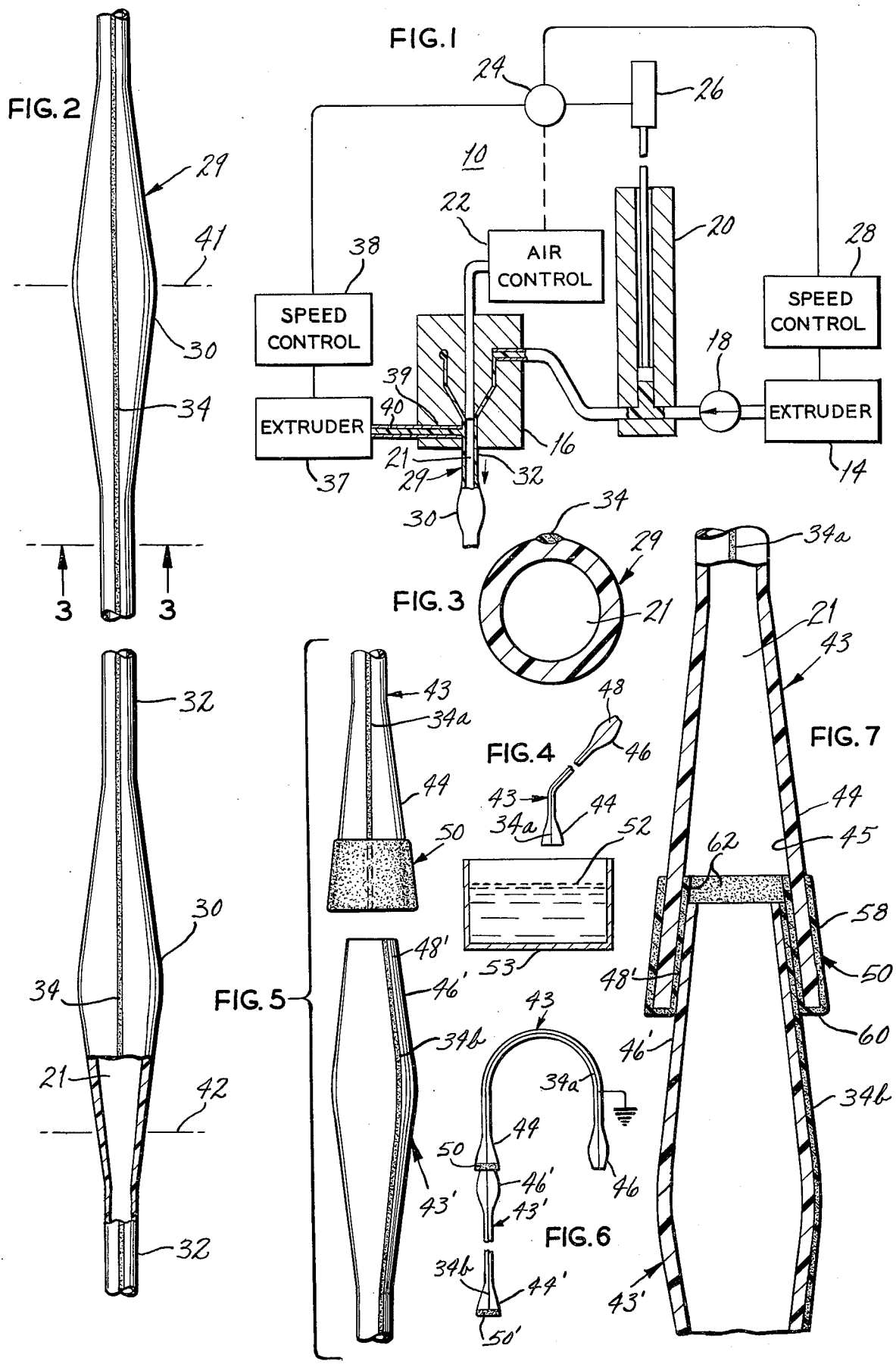

CONDUCTIVE TUBING AND METHOD OF MAKING SAME

BACKGROUND OF THE INVENTION

This invention relates to plastic tubing having a conductive stripe thereon for preventing the accumulation of electrostatic charges and more particularly to such plastic tubing with connector means for effecting fluid and electrical connection between the tubing and another member, and to a method of making tubing of this type.

Plastic tubing has been made with conductive plastic stripes or filaments along its length for grounding the tubing to prevent build-up of electrostatic charges and sparking. Such tubing is utilized where combustible atmospheric conditions may occur. For example, medical and surgical tubes such as catheters, suction tubes, oxygen and anesthesia administrating tubes and the like, are used in hospitals where combustible atmospheric conditions often occur. U.S. Pat Nos. 3,070,132 and 3,580,983, for example, disclose plastic tubing having longitudinally extending conductive plastic stripes or filaments for preventing electrostatic spark discharges.

There have been certain undesirable features associated with the use of such conductive tubes. In some cases, a special and relatively expensive connector or coupling element of metal or metal and plastic has been required to connect a tube in fluid tight connection and in electrical connection with another device, such as another conductive tube. In the above-mentioned U.S. Pat. No. 3,580,983, special molded fittings which may be made of the same material as the conductive plastic stripe, are secured to the end of a tube by fusion or cementing. Separate connectors or fittings not only increase the amount of material and other manufacturing costs, but increase the number of points of possible fluid leaks, as well as increase the number of electrical connections required. In some cases, tubing was provided with longitudinally conductive stripes or filaments having a thickness greater than the wall thickness of the tube which resulted in a bulge in the inner and outer walls of the tube. When another device or tube with a stripe was connected for fluid tight and electrical connection, the engaged bulging stripes tended to prevent a fluid tight connection and this tended to result in fluid leakage. Also, in such devices, where a stripe of one tube was to be connected to the stripe of another tube, there was danger of misalignment of the stripes where they were to engage, and this presented the danger of not obtaining electrical interconnection between the conductive stripes of the tubes.

SUMMARY OF THE PRESENT INVENTION

It is therefore an object of the present invention to provide a plastic tube having a conductive stripe for preventing the accumulation of electrostatic charges thereon which has connector means for connecting another member to the tube which has conductive material thereon, wherein the connector means is simple in construction and use and provides reliable mechanical and electrical interconnection between the tube and member, and wherein the above-mentioned undesirable features are substantially obviated.

Another object is to provide a simple and economical method of making tubes of the above type.

In accordance with one form of the present invention, a plastic tube is provided which has a conductive stripe and an integral connector provided with a conductive coating which is connected with the conductive stripe and adapted to be engaged for electrical contact with a member to be connected with the tube. In accordance with another form of the invention, conductive plastic tubing is made by extruding tubing, applying a conductive stripe longitudinally of the tubing, cutting the tubing through to provide a tube with a connector and coating the connector with a conductive material so that it is in contact with the conductive stripe and engageable with a member to be connected with the tube.

These as well as other objects and advantages of the present invention will become more apparent from the following detailed description and accompanying drawing in which like reference characters indicate like parts.

BRIEF DESCRIPTION OF THE DRAWINGS

FIG. 1 is a schematic illustration of extruding apparatus used in the manufacture of plastic tubing in accordance with a preferred embodiment of the present invention;

FIG. 2 is a fragmentary plan view, partly in cross-section, of plastic tubing formed by the apparatus of FIG. 1;

FIG. 3 is a cross-sectional view taken along the line 3—3 of FIG. 2;

FIG. 4 is a diagrammatic view illustrating another step in the manufacture of conductive plastic tubing in accordance with the preferred embodiment of the present invention;

FIG. 5 is a plan view illustrating the end connectors of a pair of finished conductive tubes made in accordance with the present invention;

FIG. 6 is a plan view on a reduced scale of the tubes of FIG. 5 but showing them connected together; and FIG. 7 is a cross-sectional view on an enlarged scale of the interconnected end connectors of the tubes of FIG. 6.

DESCRIPTION OF THE PREFERRED EMBODIMENT

Referring now to the drawing, there is shown in FIG. 1 for the purpose of illustration, extruding apparatus, indicated at 10, which can be used in the process of making conductive tubing in accordance with the present invention.

Extruding apparatus 10 is shown including an extruder 14 for supplying molten plastic to a tube forming die 16 through a one-way check valve 18. A piston operated injection-accumulator 20 is shown connected between the valve and die to selectively withdraw plastic from the flow path and inject accumulated plastic into the path. Air is injected into the tubing lumen 21 and controlled by a conventional air control member 22. A programmer or central control 24 is connected to the air control member 22, an injector-accumulator controller 26, and a speed control 28 for controlling the extruder 14. By programming the injection and withdraw phases of the injector-accumulator with the speed of the extruder and injection of air, tubing extrudate 29 having enlarged portions or bubbles 30 along the length thereof and main portions 32 of constant diameter, as seen also in FIG. 2, is readily produced. Each bubble 30 tapers radially inwardly from the middle portion of greatest diameter toward its opposite ends. For a further detailed description of apparatus for producing tubing having walls which vary in thickness and which vary in diameter, reference may be made to U.S. Pat. No. 3,674,404.

The tubing 29 is preferably formed of a flexible, transparent vinyl chloride polymer, although other well-known plastic materials, for example, a copolymer of vinyl chloride (e.g., 85 percent by weight) and vinyl acetate (15 percent by weight), and ether or ester type thermoplastic polyurethanes may be used.

In addition to producing portions 32 of constant diameter and the conical-ended bubbles 30, a flexible conductive filament or stripe 34 (FIG. 2) is applied longitudinally of the tubing 29. This is accomplished in the illustrated embodiment by providing an extruder 37 and speed control 38 operated by the programmer 24. The extruder 37 supplies conductive plastic material 40 through a small passage or tube 39 extending through the die to the plastic tubing 29 near the die outlet orifice. In this way, the material 40 is applied as a conductive stripe 34 which is continuously extruded the entire length of the tubing and simultaneously with the tubing. The stripe 34 is illustrated in FIG. 3 as extending slightly radially into the wall of the tubing and protruding only slightly above the outer periphery, although various modifications are possible. If, for example, the right end of tube 39 is moved further into the path of the molten plastic, the stripe will further penetrate the tubing wall, and vice versa. The stripe 34 may extend to the interior wall of the tubing or be applied only to the exterior surface of the tubing.

The conductive plastic material 40 preferably is a vinyl chloride compound with conductive carbon particles or powder in an amount to make the stripe 34 sufficiently conductive. For example, the material forming the stripe 34 may contain 40 percent (by weight) commercial powdered conductive carbon and 60 percent vinyl chloride compound. While powdered metals may be used in some cases, carbon has an inertness which is desirable for many applications, such as for the medical and surgical fields. After the extruded tubing 29 and stripe 34 have cooled, the tubing is predeterminately cut along its length to provide tubes of desired lengths with opposed ends of preselected diameter or shape. In FIG. 2, lines 41 and 42 represent points along the tubing 29 at which it is preferably cut to provide tubular members or tubes, such as indicated at 43 in FIGS. 4–7, of predetermined length having integral end portions or end connectors 44 and 46, and a portion of conductive stripe 34 extending end-to-end and indicated at 34a in FIGS. 4–7. Connector 44 has interior walls 45 (FIG. 7) that taper or flare radially outwardly towards its free end, and integral connector 46, at the opposite end of the tube, has exterior walls 48 (FIG. 4) that taper radially inwardly towards its free end.

The integral connector 44 of tube 43 is now provided with a conductive coating or layer 50 on the end thereof (FIGS. 5–7) which is in electrical contact with conductive stripe 34a and which is adapted to make electrical contact with a conductive element of another member, such as another tube identical to tube 43, as will be more fully explained hereinafter. In the illustrated embodiment, this conductive layer 50 is a flexible conductive plastic coating or film applied by a dipping step, as illustrated in FIG. 4. The connector 44 is dipped into a solution of conductive material 52 disposed in a container or tank 53. The solution 52 includes a conductive plastic material, preferably vinyl chloride plastic and conductive carbon powder, and a suitable high solvating solvent, such as cyclohexanone, tetrahydrofuran or the like. For example, the conductive plastic material may be a mixture of 40 percent (by weight) conductive carbon powder and the remainder vinyl chloride compound, the same as that of stripe 34. The solution may contain about 20 percent (by weight) conductive plastic material and 80% tetrahydrofuran.

The end of the integral connector 44 is dipped into the solution and the liquid coating on its end is air dried to evaporate the solvent and form the conductive plastic layer or coating 50. The layer 50 is shown covering the end of the stripe 34a so that it is in good electrical contact with it. The conductive layer 50, as seen also in FIG. 7, tenaciously adheres to the plastic tube 43 and extends over the end of the connector 44 and longitudinally in the reverse direction along the interior wall 45 of the tube. The coating 50 thus includes an external band 58 integral with an annular end portion 60 which adheres to the tip end of the connector 44 and which also connects with a band 62 adhering to the interior wall 45 of the tube.

Preferably, the solvent used in the solution 52 is one that is also a solvent for the material of tubing 29 so that it attacks or slightly dissolves the surface of the tubing material to effect an intermingling of the plastic materials or migration of the conductive plastic into the tube material. In this way, there is an interface layer or zone which includes the conductive plastic material and the material of tube 43 so that layer 50 is integrally connected to the tube and will not peel off. The solvent is preferably also a solvent for the plastic material of stripe 34a. Thus, in the preferred embodiment, the solvent, tetrahydrofuran or cyclohexanone, serves as a solvent and attacks a surface layer of the stripe 34a and tube 43 so that the layer 50 is bonded with them.

The thickness of layer 50 is substantially less than that of walls of the plastic tube 43, such as less than one-tenth of the wall thickness. For example, the wall thickness of the constant diameter portion 32 of the tube may be .125 of an inch while the thickness of layer 50 may be 0.001 or 0.002 of an inch. Preferably, layer 50 is less than 0.010 of an inch. By employing a conductive plastic layer of this type, considerable savings in material and cost are realized when compared to the use of a separate connector. Also, no additional adhesive is required.

In FIGS. 5–7, generally second tube identical to tube 43 is indicated at 43'. In FIGS. 6 and 7, the tubes 43 and 43' are shown interconnected in fluid tight connection with their conductive stripes 34a and 34b in electrical connection. The coated interior wall 45 of the connector 44 defines a generally conical bore to receive the end or connector 46' of tube 43' in fluid tight sealing engagement. It will be seen that the plastic conductive stripe 34b on the external tapered walls 48' of connector 46' engages, in good electrical contact, the internal plastic conductive band 62 of the coating 50 on the connector 44, and is thus in electrical connection with stripe 34a. The stripes 34a and 34b may be grounded as indicated in FIG. 6 by any suitable ground wire.

Since the conductive plastic band 62 extends entirely around the connector wall 45 for 360°, the stripes 34a and 34b need not be aligned with each other for good electrical connection, that is, the tube connector end 46' may be inserted at any angular relationship with respect to the connector 44 and stripes 34a and 34b will be in good electrical connection. In the preferred embodiment, the plastic material of the tube 43, stripe 34a and coating 50 are all based on the same plastic material, in this case, vinyl chloride with the result that the adhesive bonds between the plastic stripe, coating, and the tube are excellent.

The connectors 44 and 46 have walls which are sufficiently thick to permit manual connection of them is sealing engagement with another member without kinking. This is accomplished by controlling the extrudate 29 in a manner to provide the bubbles 30 in FIG. 2 with walls which are thicker than the walls of constant diameter portions 32. The walls of the bubbles become thinner as they approach the portions 32.

While the preferred method of providing a conductive coating on the connector end includes dipping in a solvent solution and then drying to release the solvent, other methods, such as spraying and the like, can be used. Where desired, both end connectors of each tube can be advantageously provided with a conductive plastic coating such as coating 50.

While the tubing 29 is shown severed at locations 41 and 42 to provide tapered connectors 44 and 46, such tubing can be severed at other locations where desired. For example, the tubing may be severed at a portion 32 of constant diameter to provide a connector which does not taper. Such a straight end connector can be inserted in fluid tight relation into a radially outwardly flared connector of suitable size or it can receive, in fluid tight relation, a connector which is tapered radially inwardly and of suitable size.

While the stripe 34a is preferably extruded onto the molten tubing 29 as described and illustrated herein, a suitable conductive stripe or filament may be applied to the tubing after it has been cooled. Also, the tubing may be cut into desired lengths of tubing and the conductive stripe then applied in a suitable manner to each tubing length.

As is well known in the art, the plastic materials used in the tubing, stripe and conductive layer may, of course, include plasticizers that provide a desired flexibility or other materials to provide other desired final characteristics. Also, the tubing may be formed or extruded from rubber and various compositions thereof with the conductive stripe and conductive layer formed from well-known conductive rubber compounds.

In view of the above, it will be seen that the objects of the invention, as well as other advantageous results are obtained. As various changes could be made in the above disclosure without departing from the scope of the invention, it is intended that all matter in the above description and shown in the drawing shall be interpreted as illustrative and not in a limiting sense.

What is claimed is:

1. A medical tube comprising a tubular member of plastic material including an integral connector at one end having an interior wall tapering radially outwardly toward the free end thereof for receiving in fluid tight communication another member having electrically conductive means on the exterior thereof, an electrically conductive plastic stripe adhering to and extending generally longitudinally along substantially the entire length of said tubular member for preventing the accumulation of electrostatic charges on the tube, said stripe having a width substantially narrower than that of said tubular member and having the radially outer surface thereof exposed, and a coating of electrically conductive plastic material adhering to said connector and including a coating portion on the exterior wall of said connector covering and in electrical contact with a part of said stripe, a coating portion on the interior wall of said connector extending over a substantial circumferential surface area thereof for electrical contact engagement with the conductive means on the other member when the other member is connected in fluid communication with said connector, and a coating portion on the free end of said connector electrically connecting the coating portion on the interior wall of said connector to the coating portion on the exterior wall of said connector, the thickness of said coating being less than that of the wall of said tubular member.

2. The medical tube of claim 1 wherein said tubular member comprises vinyl chloride.

3. The medical tube of claim 2 wherein said stripe and said coating comprise conductive carbon.

4. The medical tube of claim 1 wherein said tubular member, said stripe, and said coating all include the same type of plastic material.

5. The medical tube of claim 4 wherein said same type of plastic material comprises vinyl chloride.

6. The medical tube of claim 1 wherein the thickness of said coating is less than 0.01 of an inch.

7. The method of making a medical tube with means for preventing the accumulation of electrostatic charges thereon and adapted for connection with another member which has conductive means thereon, comprising the steps of forming a tube of plastic material having a stripe of electrically conductive plastic material having a width substantially narrower than the width of the tube and adhering to and extending along substantially the entire length of the tube with the radial outer surface thereof exposed, and an integral tube connector at one end of the tube with the interior walls thereof tapering radially outwardly toward the free end thereof for receiving said other member in fluid tight frictional engagement, applying a liquid coating comprising an electrically conductive material and a plastic material onto said connector to coat the interior, exterior, and free end walls of said connector with the coating on the exterior of said connector extending over a portion of said stripe and in electrical contact therewith, and solidifying the coating in situ to form a conductive plastic coating adhering to said connector for connecting the conductive means of the other member when it is connected to said connector in electrical connection with said stripe.

8. The method of claim 7 wherein the plastic materials of said tube, stripe, and coating are of the same type.

9. The method of claim 8 wherein said same type of plastic material comprises vinyl chloride.

10. The method of claim 9 wherein said liquid includes a solvent of the type that attacks vinyl chloride.

11. The method of claim 7 wherein said liquid includes a solvent of a type that attacks the plastic materials of said tube, stripe, and coating to bond said coating to said tube and said stripe.

12. The method of claim 11 wherein said step of forming said tube comprises extruding vinyl chloride compound in tube form, and simultaneously extruding said stripe with the extrusion of said tube.

13. The method of claim 7 wherein said step of applying the liquid coating comprises dipping the connector into a quantity of the liquid coating.

* * * * *